United States Patent Office 3,228,958

Patented Jan. 11, 1966

3,228,958

VAT DYES

Jan Jacobus Antonius Moll, Vlaardingen, Netherlands, assignor to Fabriek Van Chemische Producten Vondelingenplaat N.V., Rotterdam, Netherlands, a corporation of the Netherlands No Drawing. Filed Aug. 10, 1962, Ser. No. 216,041
9 Claims. (Cl. 260—316)

This invention relates to new vat dyes of the pentacene diquinone type.

The new dyes are pentacene diquinone derivates obtained by cyclisation and oxidation of compounds having the general formula

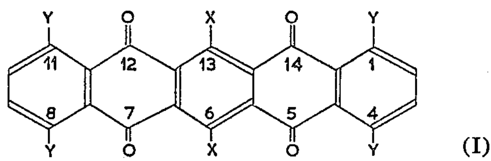

(I)

wherein the substituents X each may represent a hydrogen or halogen atom or an amino, alkylamino, alkyl or alkoxy group and the substituents Y each stand for a hydrogen atom or an arylamino or substituted arylamino radical containing at least 14 carbon atoms, at least one of the substituents Y being the said arylamino or substituted arylamino radical, to form the corresponding carbazole compounds, that is to say compounds wherein a benzene nucleus of the pentacene diquinone radical and a benzene nucleus of the arylamino substituent are interconnected by a pyrrole nucleus formed by the cyclisation and oxidation.

The new compounds are vat dyes having excellent properties. They can be represented by the formula

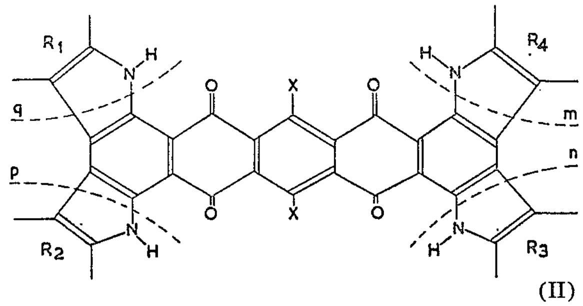

(II)

in which $R_1$, $R_2$, $R_3$ and $R_4$ each represent a condensed ring-system having at least 14 carbon atoms, one of the indices *m*, *n* *p* and *q* is equal to 1 and the other indices are 0 or 1.

The starting compounds having the abovementioned Formula I can be prepared in several ways, namely by condensing halopentacene diquinones with arylamines or by condensing aminopentacene diquinones with arylhalogenides.

Thus in condensing 1 mole of the dianhydride of pyromelitic acid or a derivative thereof having the formula

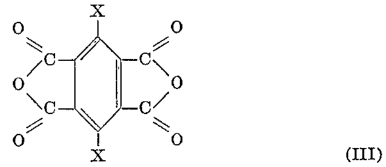

(III)

wherein X is one of the substituents mentioned hereinbefore, with 2 moles of p-dichlorobenzene in a manner known per se (Friedel-Crafts reaction) a mixture of 4,6-bis (2,5-dichlorobenzoyl) isophthalic acid and 2,5-bis (2,5-dichlorobenzyol) terephthalic acid is obtained, both of which give 1,4,8,11-tetrachloropentacene diquinone after dehydration.

In a similar manner the 1,4-dichloro derivative is obtained by condensing pyromellitic acid or a derivative thereof first with 1 mole of p-dichlorobenzene and then with 1 mole of benzene.

By nitration of pentacene diquinone a mixture of 1,8- and 1,11-dinitropentacene diquinone is obtained. Separation and reduction give 1,8- and 1,11-diaminopentacene diquinone. 1-aminopentacene diquinone can be formed by reduction of the 1-nitro derivative obtained by mono nitration.

By nitration and reduction 1,4-dichloro 8 aminopentacene diquinone is obtained from 1,4-dichloropentacene diquinone. Subsequent condensation with an arylamine and an arylhalogenide leads to compounds having the Formula I wherein one Y substituent is a hydrogen atom and the other Y substituents are arylamino radicals.

In case Y is an arylamino group having at least 14 carbon atoms without substituents, dyes are obtained by condensing, for example, 1 mole or 1,4,8,11-tetrachloropentacene diquinone with 4 moles of 1-aminoanthraquinone, followed by cyclisation and oxydation to form the corresponding carbazole compound having the formula

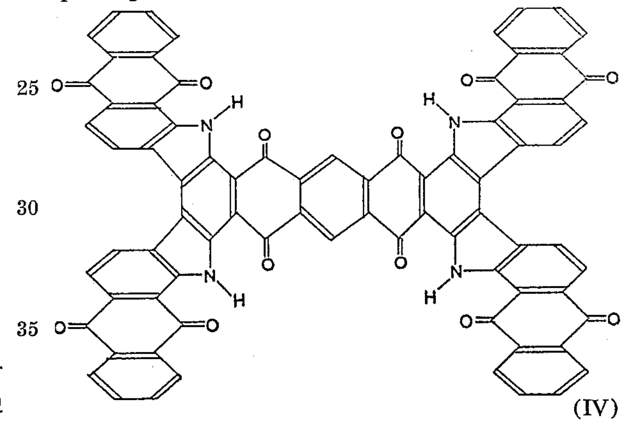

(IV)

Instead of 1-aminoanthraquinone, 1-aminopentacene diquinone can be used.

Schematically, the compound having the Formula IV may be represented by $P(CA)_4$ wherein P is a pentacene diquinone radical, C is a pyrrole nucleus (obtained by the cyclisation and oxydation), and A is an anthraquinone radical.

In condensing 1 mole of 1-aminopentacene diquinone with 1 mole of 1-chloropentacene diquinone compounds having the Formula I are obtained wherein 3 Y substituents are hydrogen. Cyclisation and oxydation give a condensation product which is a dye which may be represented by PCP.

Compounds wherein Y is a substituted arylamino group having at least 14 carbon atoms can be obtained by condensing, for example, 1 mole of 1,4-diaminoanthraquinone with 2 moles of 1 chloropentacene diquinone. The dyes obtained by cyclisation and oxydation may be represented by PCACP. In this case, 3 Y substituents in Formula I are hydrogen.

Dyes which may be represented by PCBCP wherein B is a benzanthrone radical can be prepared from 1 mole of 3,9-dibromobenzanthrone and 2 moles of 1-aminopentacene diquinone.

In a similar manner a dye which may be represented schematically by $PCA(CP)_3$ can be obtained from 1 mole of 1,4,5,8-tetrachloroanthraquinone and 4 moles of 1-aminopentacene diquinone.

The following examples will further illustrate this invention but are not to be construed as being limitative.

*Example 1*

5.12 grams of 1,4,8,11-tetrachloropentacene diquinone, 8.92 grams of 1-aminoanthraquinone, 4.25 grams of anhydrous soda and 0.1 gram of copper powder are added to 200 ml. of nitrobenzene. The mixture is stirred at 208–210° C. during 24 hours. After cooling to 20° C. the mixture is filtered and the filter cake is washed with 50 ml. of nitrobenzene, whereafter the nitrobenzene is removed from the paste by distillation with steam. Then 50 ml. of hydrochloric acid of 36% are added and the mixture is boiled during 1 hour. Thereafter the mixture is filtered and the filter cake is washed until it is free of acid, and dried at 100° C. The resulting product is 1,4,8,11-tetra (anthraquinonylamino)pentacene diquinone (yield 9 grams). 5 grams of this product are added to a molten mixture of 30 grams of aluminiumchloride and 4 grams of sodiumchloride having a temperature of 160° C. The temperature is held on 200° C. during 1 hour. After cooling 300 ml. of water and 50 ml. of hydrochloric acid of 36% are added. After stirring during some time the mixture is filtered and washed until it is free of acid.

The paste is taken up in 200 ml. of water and 20 ml. of sulphuric acid of 96% whereafter a solution of 3 grams of sodium bichromate in 48 ml. of water is added at 70° C. in the course of 2 hours. The stirring is continued at 70° C. during 12 hours whereafter the mixture is filtered and the filter cake is washed until it is free of acid, and dried at 100° C. 4.5 grams of the dye represented by Formula IV are obtained.

It dyes cotton in a yellow-brown shade.

The fastness properties are as follows:

Light fastness (1/6 standard depth) 6
Light fastness (1/1 standard depth) 6–7
Chlorine fastness (1/1 standard depth) 3
Fastness to washing (1/1 standard depth, 95° C.) 5.

*Example 2*

In a similar procedure as described in Example 1 18 grams of 1,4,8,11-tetra (pentacene diquinoylamino)pentacene diquinone are obtained from 4.8 grams of 1,4,8,11-tetrachloropentacene diquinone, 14.1 grams of 1-aminopentacene diquinone, 4.5 grams of anhydrous soda and 0.1 gram of copper powder. Cyclisation and oxidation in the manner described in Example 1 yield 4 grams of dye from 5 grams of the condensation product. Cotton is dyed in a brown shade.

*Example 3*

40 grams of 3,9-dibromobenzanthrone, 71 grams of 1-aminopentacene diquinone, 15 grams of anhydrous soda and 1 gram of copper powder are added to 300 ml. of nitrobenzene. The temperature is raised to 210° C. and is maintained at this level during 24 hours. Then, the mixture is cooled down and filtered and the filter cake is washed with nitrobenzene. The paste is freed from nitrobenzene by distillation with steam. After filtration the paste is suspended in 500 ml. of water and acidified with hydrochloric acid to a pH value corresponding to the range of colour change of Congo red, whereafter it is boiled and filtered and the filter cake is washed with water until it is free of acid. After drying 90 grams of a product are obtained, which may be represented by the formula

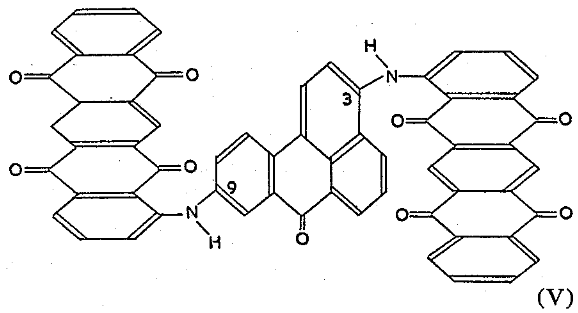

30 grams of this condensation product and 7 grams of anhydrous sodium acetate are added to a mixture of 150 ml. of isobutanol and 57 grams of KOH, heated to 100° C. The temperature is raised to 125° C. and the mixture is reacted at 125–130° C. during 4 hours. The isobutanol is distilled off as an azeotropic mixture with water while carefully adding water. Then, more water is added and the dye is oxidised with air until the dye has become insoluble in the diluted KOH solution. Thereafter, the mixture is filtered and the filter cake is washed until it is free of alkali, and dried.

The yield is 28 grams of a dye which dyes cotton in an olive shade.

Schematically, this dye may be represented by PCBCP.

*Example 4*

5 grams of 1 chloroanthraquinone, 3.6 grams of 1,8-diaminopentacene diquinone, 2 grams of anhydrous soda and 0.25 gram of copper powder are added to 100 ml. of nitrobenzene. Condensation and cyclisation are carried out in the manner described in Example 1 while using a mixture of 30 grams of $AlCl_3$ and 4 grams of NaCl.

Oxidation takes place by suspending the paste in 500 ml. of water and 50 grams of NaOH, heating to 90° C. and adding a sodium hypochlorite soltuion and potassium permanganate in several portions until the desired colour (yellow) is reached. Then, the mixture is filtered and the filter cake is washed until it is free of alkali. The paste is suspended in 250 ml. of water and acidified with concentrated hydrochloric acid to a pH value corresponding to the range of colour change of Congo red.

At 90° C. sodium bisulphite is added until the manganese dioxide formed is removed by reaction therewith. Then, the mixture is filtered and the filter cake is washed until it is free of acid, and dried.

What I claim is:

1. A vat dye having the formula

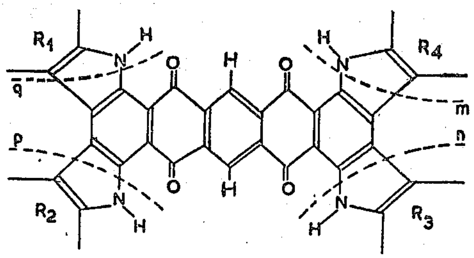

wherein each of $R_1$, $R_2$, $R_3$ and $R_4$ represents a condensed ring system selected from the group consisting of anthraquinone, benzathrone and pentacene diquinone, which is attached to the pentacene diquinone radical via a pyrrole nucleus, one of the indices *m*, *n*, *p* and *q* is equal to 1 and the other indices are integers selected from the group consisting of zero and one.

2. A vat dye according to claim 1, wherein in the formula $m=1$, and *n*, *p* and *q* each are zero.

3. Vat dye having the formula

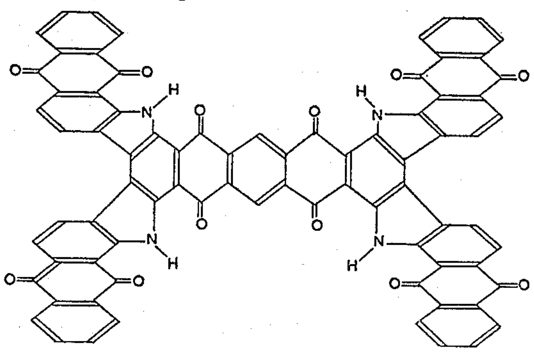

4. Vat dye having the formula

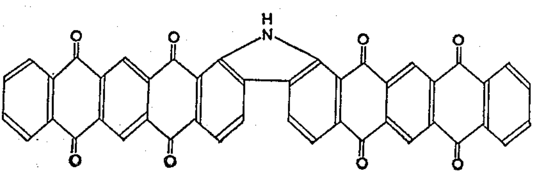

5. Vat dye having the formula
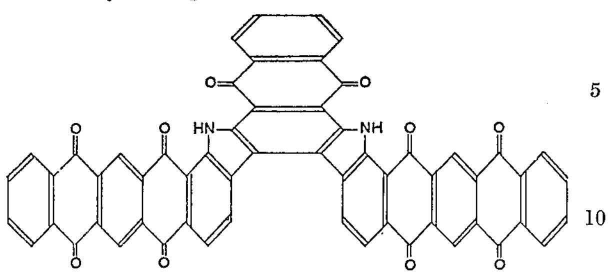
6. Vat dye having the formula
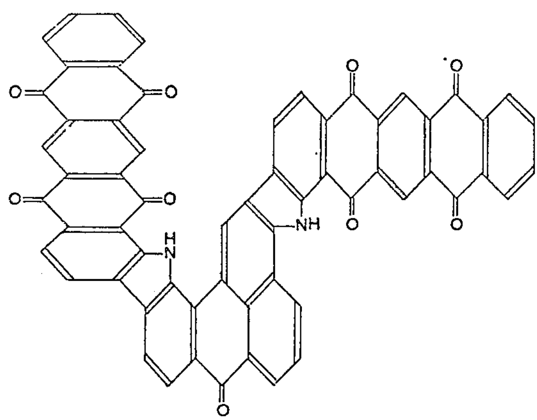
7. Vat dye having the formula
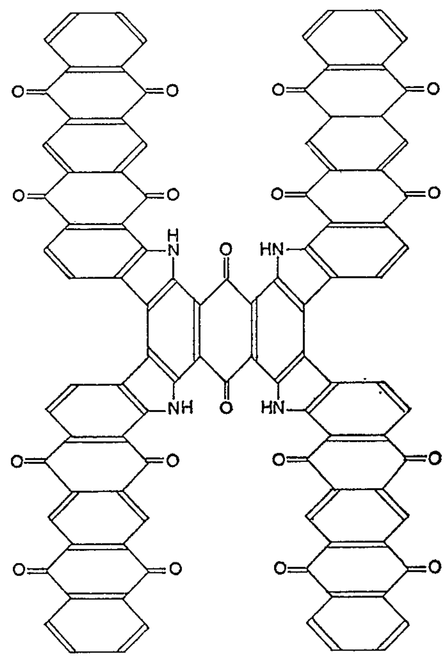
8. Vat dye having the formula
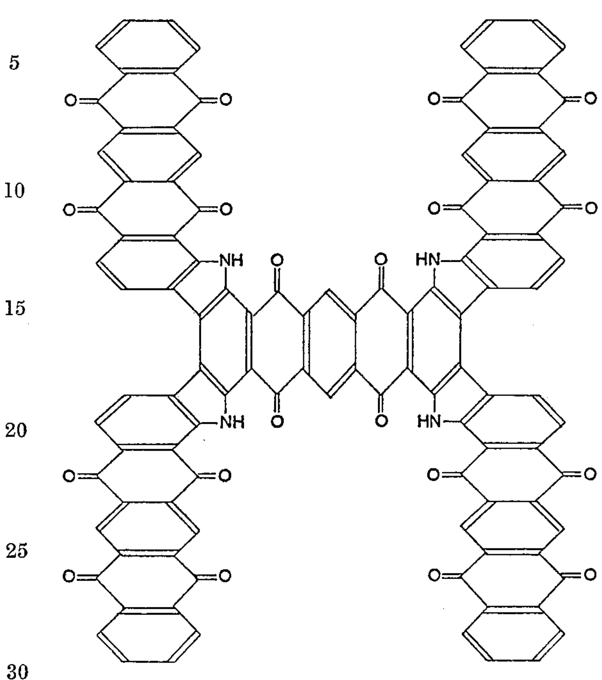
9. Vat dye having the formula
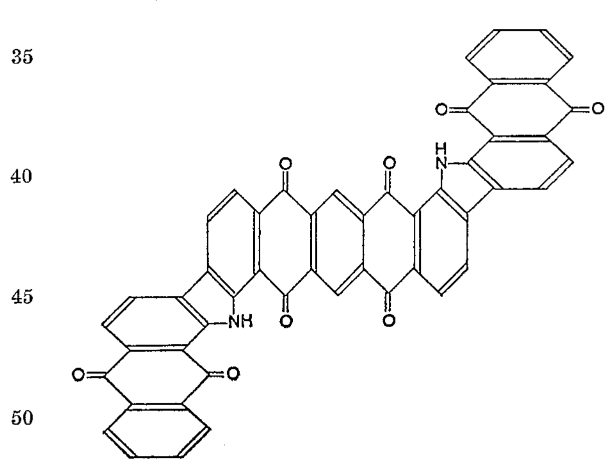
No references cited.
JOHN D. RANDOLPH, *Acting Primary Examiner.*
DUVAL T. McCUTCHEN, WALTER A. MODANCE, *Examiners.*